Nov. 27, 1951  J. W. MYERS  2,576,632
ELECTRICAL HEATING UNIT
Filed Sept. 13, 1948
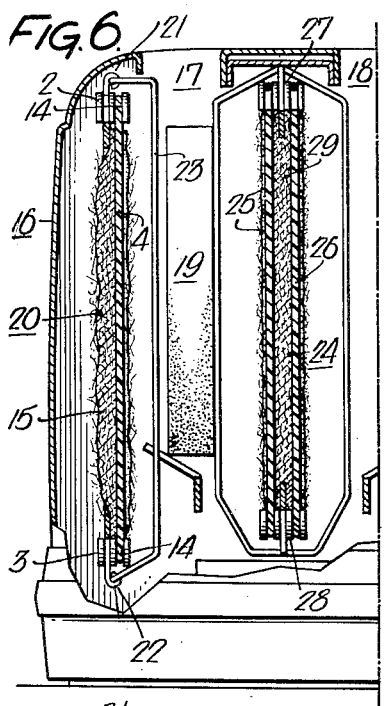
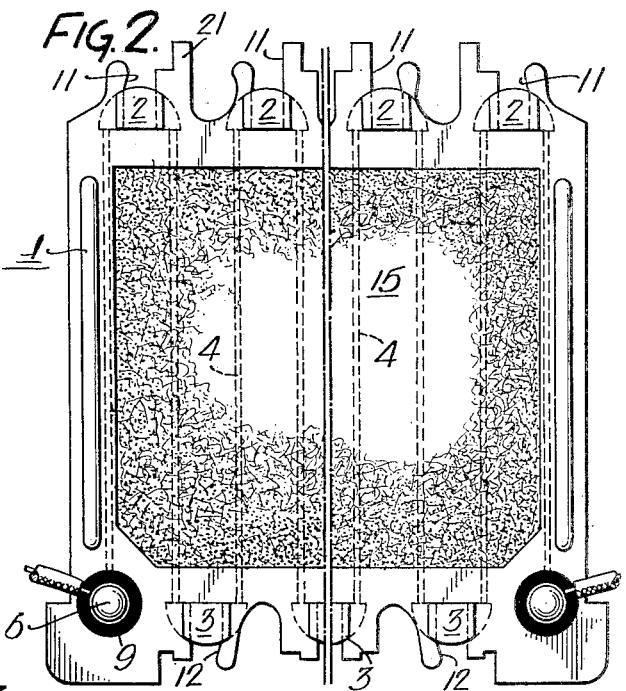
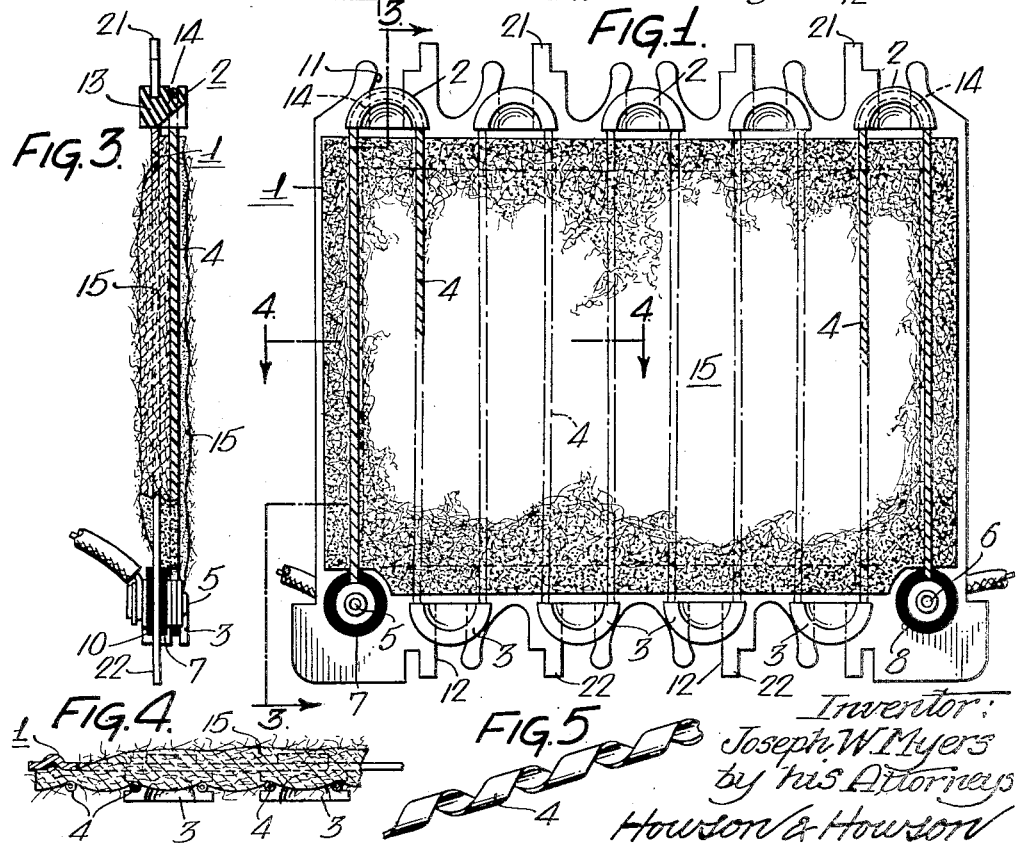
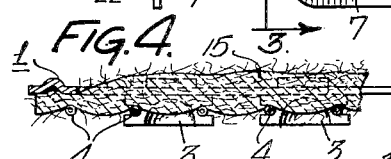
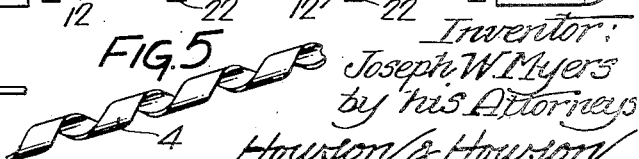
Inventor:
Joseph W. Myers
by his Attorneys
Howson & Howson Patented Nov. 27, 1951

2,576,632

UNITED STATES PATENT OFFICE 2,576,632

ELECTRICAL HEATING UNIT

Joseph W. Myers, Philadelphia, Pa., assignor to Proctor Electric Company, Philadelphia, Pa., a corporation of Pennsylvania Application September 13, 1948, Serial No. 49,080

8 Claims. (Cl. 219—19)

This invention relates to electrical heating units, and more particularly to heating units of the general type employed in bread toasting devices. While the invention is directed especially to heating units for toasters, it is not restricted to such elements but is applicable in any instance in which it may find useful application.

In automatic bread toasters, the problem of providing efficient performance during the first operation is well recognized. This problem is to provide practical means to reduce the time required to produce toast in the first operation of a toaster without excessively reducing the time required to produce toast in successive operations. Many unsuccessful attempts to solve this problem have been made, and the principal manufacturers of high quality automatic toasters have been forced to resort to various means for automatically compensating for the progressive reduction of the time required to toast bread as the toaster becomes heated during the first few operations. Among the schemes that have been tried has been an attempt to reduce the thermal inertia of the supporting members for the electrical resistance wires. These supports are conventionally made of mica or asbestos. Another scheme has been the elimination of the wire-supporting sheets themselves, and the stringing of the resistance heating wires in air on spaced supports. This has proven ineffective because, among other reasons, the increased convection draft around the wires has reduced their temperature. Still another scheme which has been tried is that of incorporating a relatively heavy insulating material adjacent the back side of the heating elements. While this scheme was thought to prevent heat loss in that direction, it resulted in an even greater difference between the first and successive operations due to the increase in thermal inertia of the added insulation. A scheme which slightly improves the overall efficiency of toasters is to employ reflector plates behind the heating element supports, but this does not appreciably reduce the time difference between the duration of the first and subsequent toasting operations.

The principal object of this invention is the provision of means, in electrical bread toasters, whereby the long time required to produce toasted bread of any desired color starting from cold, is reduced and the difference of toasting times between the first "from cold operation" and subsequent operations is also reduced.

Heretofore, the majority of the high quality automatic toasters, having vertically disposed toasting wells, have employed heating units in which there is more heat generating capacity near the bottom than at the top. This variation in heat generating capacity has been accomplished in several ways, the most common of which is the utilization of horizontally wound resistance wire with the runs closely spaced near the bottom of the heating unit and gradually more widely spaced as the top of the unit is approached. The increase in spacing has been determined to be such that the upper runs of the element are approximately twice as widely spaced as the lower runs. Somewhat less common is the arrangement of the wire in radially divergent vertically extending runs which are less widely separated at the bottom than at the top. The concentration of a major portion of the heat generating capacity on the bottom half of the heating unit provided a way of compensating for the effect of rising air currents.

A second object of this invention is the provision of means, in a toaster heating unit, whereby substantially uniformly spaced vertically disposed runs of the heating wire may be used to produce a high level of radiant heat over the entire toasting surface of the bread, the effect of convected air currents for the most part having been eliminated.

A further object of this invention is the provision of a resistance heating wire which has a high level of radiant heat output and is of such form as to maintain its spaced position under the high temperatures resulting from high energization and radiant energy level.

This invention contemplates the provision, in an automatic toaster, of heating units in which the heating wire is supported on a frame which minimizes the amount of heating wire in close thermal association with the frame, and, in which a backing of fine, lightweight mineral fiber material is supported by the frame adjacent the back side of the wire. The term "mineral fiber material" is employed generically to include the artificial wool-like materials obtained by the fiberization of molten slag, glass, and like siliceous-containing material. Toasters constructed according to this invention produce toast of any desired color in approximately half the time required by conventional toasters of comparable quality having the same current consumption. Also toasters having heating units of this type do not decrease noticeably the time required to make toast in later operations below that required in the first "from cold" operation. The time required for producing toast of any desired color on the first operation from a cold start is but a few seconds greater than for successive operations, and the toast made in these substantially equal toasting times, including the first, is of highly satisfactory quality.

The invention may be clearly understood from the following detailed description with reference to the accompanying drawing, wherein Fig. 1 is a front elevational view of a toaster heating unit embodying the invention;

Fig. 2 is a rear elevational view of the same;

Fig. 3 is a sectional view taken along line 3—3 of Fig. 1;

Fig. 4 is a fragmentary sectional view taken along line 4—4 of Fig. 1;

Fig. 5 is a fragmentary large-scale perspective view of the preferred form of heating wire employed; and Fig. 6 is a fragmentary cross-sectional view of a toaster employing the novel heating element.

Referring first to Figs. 1 to 4, there is shown, by way of example, a toaster heating unit of the type which is intended to radiate heat only from one side thereof which may be regarded as the front face. In accordance with the present invention, there is provided a rigid supporting frame 1 which may be formed of metal and which is preferably of rectangular shape. The frame 1 supports insulating wire-holding members 2 and 3 at the top and bottom respectively of the frame, and a resistance wire 4 extends substantially in a plane area back and forth between the upper and lower members 2 and 3, the ends of the heating wire being secured to terminal elements 5 and 6 which may be in the form of rivets extending through the frame member and insulated therefrom by suitable insulating washers 7 to 10 at the front and rear of the frame member. The wire-holding members 2 and 3 are preferably arranged so that the wire runs therebetween are substantially vertical, and as illustrated, the runs may be uniformly spaced.

Preferably, the frame 1 is provided with slot-like recesses 11 and 12 at the top and bottom respectively to accommodate a supporting portion 13 of each wire-holding member. To this end, each of the wire-holding members is formed with a narrow neck which is slidable within one of the slot-like recesses 11 or 12 of the supporting frame. At the front, each wire-holding member has an arcuate recess 14 to retain the wire 4.

In further accordance with the present invention, there is provided a backing 15 of fine, light-weight mineral fiber material, said backing being generally in the form of a fairly flat pad of rectangular form and substantially coextensive in area with the area defined by the supporting frame. The backing layer 15 is placed with its edge portions against the front of the frame 1, as may be seen in Figs. 1 and 3, and the wire 4 is wound adjacent the front face of said layer in engagement therewith, the edge portions of said layer thus being clamped between the wire and the frame 1.

The high insulating value of the mineral fiber backing for the heating wire, combined with its low thermal mass, causes the wire and the immediately adjacent insulation to rise to its ultimate temperature more rapidly than in other constructions. This is evidenced by the glow of the wire and the speed with which it attains its ultimate color. The fibrous insulation between the wire runs provides for lower losses through convection due to the resistance to the flow of air upward along the face of the fiber backing which is offered by the many tiny fibers which project out from the plane of the backing into the rising air currents. This slowing of the convection current along the wire reduces the convection losses or cooling effect of the air current on the wires and results in a higher percentage of radiant heat output.

An important characteristic of heating units made in accordance with this invention is their ability to produce evenly toasted bread when the heat generating capacity is distributed substantially uniform over their surfaces. This is made possible by the fact that the effects of convection currents and conduction upon the heating unit are greatly reduced by the mechanism described above, which permits the wire rapidly to attain an even steady-state temperature distribution, thus giving an even density of radiant heat output per unit area of heating unit.

Because of the high thermal insulation properties of the fiber backing combined with its low thermal mass, and its ability to reduce heat loss due to convection, the heating wire operates at a relatively high temperature. As a result of this high operating temperature, there is a considerable thermal expansion in the wire. This thermal expansion, in horizontally disposed wire, produces undesirable sagging of the wire and results in possible shorting out of adjacent runs or grounding on adjacent metal parts of the frame. In certain toasters now in use, this sag of the wire is minimized by an insulating support member which holds the wires securely to the backing, commonly mica or asbestos board. This is objectionable because the insulating member covers a portion of the wires and adds to the cost of the unit.

It is desirable to provide means to prevent the distortion or sag of heating wires in toasters of this type without the use of supporting or restraining members which cast objectionable shadows on the toasted bread. The use of vertically disposed heating wire in certain prior toasters does not obviate this problem. Unless there is considerable resiliency in the wire or its supporting means, the expansion and loss of strength of the wire under its own heat will result in the same conditions as previously stated. Preferably, the wire is in the form of a helically wound ribbon, as shown in Fig. 5, which is stretched slightly between its supporting insulators. The helically wound ribbon retains its resiliency under heat and thus maintains its position on the insulating backing of the element support. Alternatively, the wire could be straight and resilient mounting means could be employed to prevent sag of the wire.

Fig. 6 shows a portion of a two-well toaster embodying heating units according to the present invention. The toaster casing 16 is formed so as to provide the two toasting wells 17 and 18 each adapted to receive a bread slice as shown at 19. Each of the outer heating units is similar to that shown in Figs. 1 to 4 and described above, one of these elements being shown at 20. The extending tabs 21 and 22 (see Figs. 1 and 2) at the top and bottom of the frame 1 serve to support the vertically extending well-defining wires 23, commonly provided in a toaster, said tabs being bent over to secure the wires, as shown in Fig. 6. The central heating unit 24 is generally similar in construction to the outer heating units but has resistance wires 25 and 26 on both faces. Accordingly, the wire-holding members 27 and 28 are formed so as to support said wires.

A common backing 29, similar to backing 15, is interposed between the heating wires.

From the foregoing description, it will be seen that the invention provides a novel heating unit which is characterized in the respects hereinbefore mentioned. It will be understood, of course, that the invention is not limited to the specific form illustrated but is capable of various modifications and other embodiments. For example, the resistance wire could be arranged in upwardly divergent runs instead of parallel runs.

I claim:

1. In a bread toaster, means for supporting a bread slice to be toasted, electrical heating means comprising resistance wire extending over an area in close proximity to a surface of the supported bread slice for radiant heating of the bread surface, and means for effecting very rapid toasting of the bread surface and for minimizing the time difference between an initial toasting operation and subsequent toasting operations, said last means comprising a backing of fine wool-like lightweight mineral fiber material immediately adjacent to said wire with the fibers of said material substantially in engaging relation with said wire.

2. In a bread toaster, means for supporting a bread slice in substantially vertical position, electrical heating means comprising resistance wire extending over a substantially vertical area in close proximity to a surface of the supported bread slice for radiant heating of the bread surface, and means for effecting very rapid toasting of the bread surface and for minimizing the time difference between an initial toasting operation and subsequent toasting operations, said last means comprising a backing of fine wool-like lightweight mineral fiber material immediately adjacent to said wire with the fibers of said material substantially in engaging relation with said wire.

3. In a bread toaster, means for supporting a bread slice in substantially vertical position, electrical heating means comprising resistance wire extending over a substantially vertical area in substantially parallel uniformly spaced runs in close proximity to a surface of the supported bread slice for radiant heating of the bread surface, and means for effecting very rapid toasting of the bread surface and for minimizing the time difference between an initial toasting operation and subsequent toasting operations, said last means comprising a backing of fine wool-like lightweight mineral fiber material immediately adjacent to said wire with the fibers of said material substantially in engaging relation with said wire.

4. In a bread toaster, means for supporting a bread slice in substantially vertical position, electrical heating means comprising resistance wire extending over a substantially vertical area in close proximity to a surface of the supported bread slice for radiant heating of the bread surface, said wire being resilient and being capable of maintaining its resilience when caused to expand and contract by heating and cooling, and means for effecting very rapid toasting of the bread surface and for minimizing the time difference between an initial toasting operation and subsequent toasting operations, said last means comprising a backing of fine wool-like lightweight mineral fiber material immediately adjacent to said wire with the fibers of said material substantially in engaging relation with said wire.

5. In a bread toaster, means for supporting a bread slice in substantially vertical position, electrical heating means comprising helical resistance wire extending over a substantially vertical area in close proximity to a surface of the supported bread slice for radiant heating of the bread surface, said wire by virtue of its helical form being resilient and being capable of maintaining its resilience when caused to expand and contract by heating and means for effecting very rapid toasting of the bread surface and for minimizing the time difference between an initial toasting operation and subsequent toasting operations, said last means comprising cooling, and a backing of fine wool-like lightweight mineral fiber material immediately adjacent to said wire with the fibers of said material substantially in engaging relation with said wire.

6. In a bread toaster, means for supporting a bread slice in vertical position to be toasted, a vertically-disposed open frame in close proximity to a surface of the supported bread slice, electrical heating means comprising resistance wire extending over an area and supported by said frame for radiant heating of the bread surface, and means for effecting very rapid toasting of the bread surface and for minimizing the time difference between an initial toasting operation and subsequent toasting operations, said last means comprising a backing of fine wool-like lightweight mineral fiber material supported by said frame immediately adjacent to said wire with the fibers of said material substantially in engaging relation with said wire.

7. In a bread toaster, means for supporting a bread slice in vertical position to be toasted, a vertically-disposed open frame in close proximity to a surface of the supported bread slice, wire-holding members on said frame, electrical heating means comprising resistance wire extending over an area and supported by said members for radiant heating of the bread surface, and means for effecting very rapid toasting of the bread surface and for minimizing the time difference between an initial toasting operation and subsequent toasting operations, said last means comprising a backing of fine wool-like lightweight mineral fiber material having its edge portions clamped between said frame and said wire, and immediately adjacent to said wire with the fibers of said material substantially in engaging relation with said wire.

8. In a bread toaster, means for supporting a bread slice in vertical position to be toasted, a vertically-disposed substantially rectangular open frame in close proximity to a surface of the supported bread slice, wire-holding members at the top and bottom of said frame projecting slightly from the side thereof toward the bread surface, electrical heating means comprising resistance wire supported by said members and extending in vertical runs between the top and bottom of said frame for radiant heating of the bread surface, and means for effecting very rapid toasting of the bread surface and for minimizing the time difference between an initial toasting operation and subsequent toasting operations, said last means comprising a backing of fine wool-like lightweight mineral fiber material supported by said frame immediately adjacent to said wire with the fibers of said material substantially in engaging relation with said wire.

JOSEPH W. MYERS.

(References on following page)

REFERENCES CITED

The following references are of record in the file of this patent:

UNITED STATES PATENTS

| Number | Name | Date |
|---|---|---|
| 449,036 | Capek | Mar. 24, 1891 |
| 533,795 | Edwards | Feb. 5, 1895 |
| 768,764 | Leonard | Aug. 30, 1904 |
| 1,241,578 | Thornton | Oct. 2, 1917 |
| 1,319,533 | Rice | Oct. 21, 1919 |
| 1,703,005 | Hewitt | Feb. 19, 1929 |
| 2,227,781 | Joy et al. | Jan. 7, 1941 |
| 2,316,699 | Myers | Apr. 13, 1943 |
| 2,372,270 | Happe | Mar. 27, 1945 |
| 2,541,273 | Myers | Feb. 13, 1951 |